United States Patent [19]

La Pierre et al.

[11] Patent Number: 5,121,997

[45] Date of Patent: Jun. 16, 1992

[54] PERFORATED TEAR STRIP FOR EASY-OPEN FLEXIBLE CONTAINERS

[75] Inventors: Frank La Pierre, Chicago; Daniel Beyer, Northbrook; Daniel P. McDonald, Arlington Heights, all of Ill.

[73] Assignee: Illinois Tool Works Inc., Glenview, Ill.

[21] Appl. No.: 695,263

[22] Filed: May 3, 1991

Related U.S. Application Data

[63] Continuation-in-part of Ser. No. 595,240, Oct. 9, 1990.

[51] Int. Cl.⁵ .................. B65D 33/24; B65D 33/34
[52] U.S. Cl. ................................ 383/203; 383/63; 383/65
[58] Field of Search ............... 383/61, 63, 65, 93, 383/95; 206/604, 617, 618, 628

[56] References Cited

U.S. PATENT DOCUMENTS

| | | | |
|---|---|---|---|
| 3,198,228 | 8/1965 | Naito | 36/42 |
| 3,226,787 | 1/1966 | Ausnit | 383/61 |
| 3,323,707 | 6/1967 | King | 229/66 |
| 3,371,696 | 3/1968 | Ausnit | 150/3 |
| 3,473,589 | 10/1969 | Gotz | 150/3 |
| 3,543,343 | 12/1970 | Staller et al. | 18/14 |
| 3,780,781 | 12/1973 | Uramoto | 150/3 |
| 3,827,472 | 8/1974 | Uramoto | 150/3 |
| 3,991,801 | 11/1976 | Ausnit | 383/61 |
| 4,268,938 | 5/1981 | Walchli | 383/63 |
| 4,615,045 | 9/1986 | Siegel | 383/5 |
| 4,651,504 | 3/1987 | Bentsen | 53/452 |
| 4,657,792 | 4/1987 | Ausnit | 428/35 |
| 4,682,366 | 7/1987 | Ausnit et al. | 383/65 |
| 4,709,533 | 12/1987 | Ausnit | 53/451 |
| 4,712,690 | 12/1987 | Stohr | 206/628 |
| 4,812,074 | 3/1989 | Ausnit et al. | 493/213 |
| 4,844,759 | 7/1989 | Boeckmann | 156/66 |
| 4,846,585 | 7/1989 | Boeckmann et al. | 383/65 |
| 4,874,257 | 10/1989 | Inagaki | 383/63 |
| 4,878,763 | 11/1989 | Ausnit | 383/65 |
| 4,894,975 | 1/1990 | Ausnit | 53/412 |
| 4,925,316 | 5/1990 | Van Erden et al. | 383/61 |
| 4,927,271 | 5/1990 | Branson | 383/61 |
| 4,966,470 | 10/1990 | Thompson et al. | 383/61 |

FOREIGN PATENT DOCUMENTS

| | | | |
|---|---|---|---|
| 101218 | 6/1965 | Denmark | 383/63 |
| 955780 | 4/1964 | United Kingdom | 383/63 |

OTHER PUBLICATIONS

Page 451 of The Wiley Encyclopedia of Packaging Technology, 1986.

Primary Examiner—Gary E. Elkins
Attorney, Agent, or Firm—Dressler, Goldsmith, Shore, Sutker & Milnamow, Ltd.

[57] ABSTRACT

An easy-open container includes a membrane forming the top edge of the container and hermetically sealing the contents thereof. Elements for opening the container are disposed on the membrane, and includes a first bead of thermoplastic material and a first perforated line for tearing across the membrane. In one embodiment the membrane is disposed inward from the mouth of the bag, leaving portions of the bag walls extending upward beyond the container top edge to form guide rails which facilitate opening of the container. One guide rail is removed as the bag is opened and remaining portions of the bag walls are offset to enhance access to the bag contents. A membrane for sealing the mouth opening of a bag-like structure is also provided, as are methods for making an easy-open container and for making a membrane having the strcutures aforesaid.

29 Claims, 7 Drawing Sheets

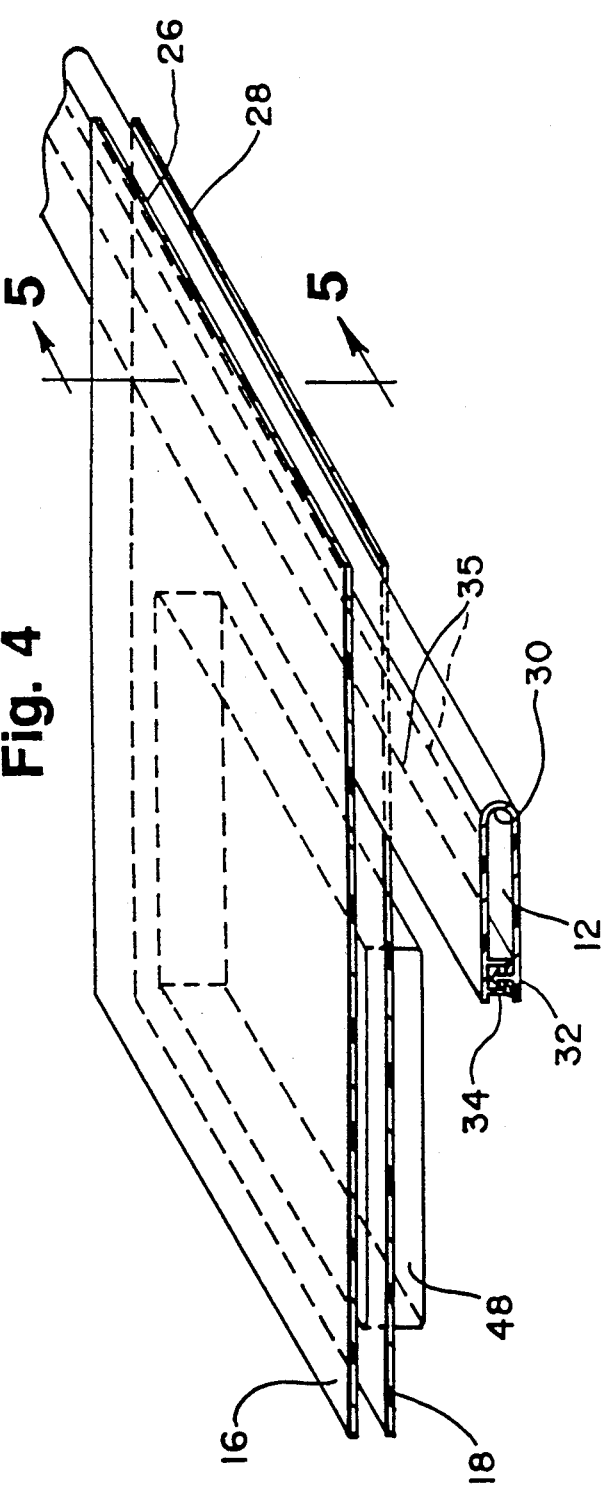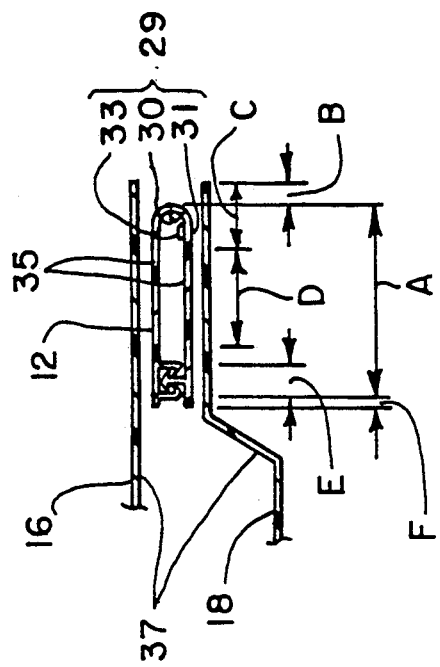

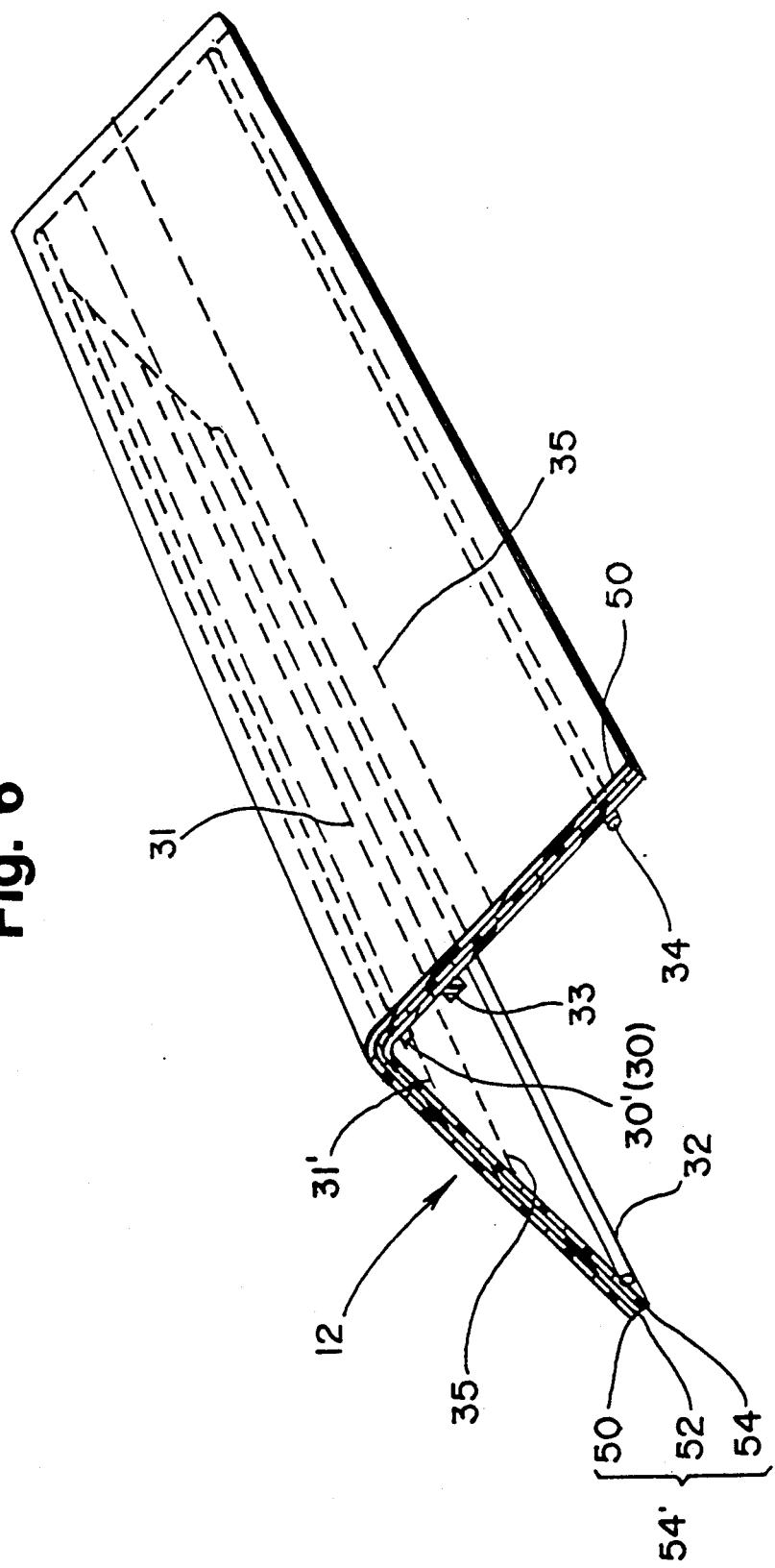

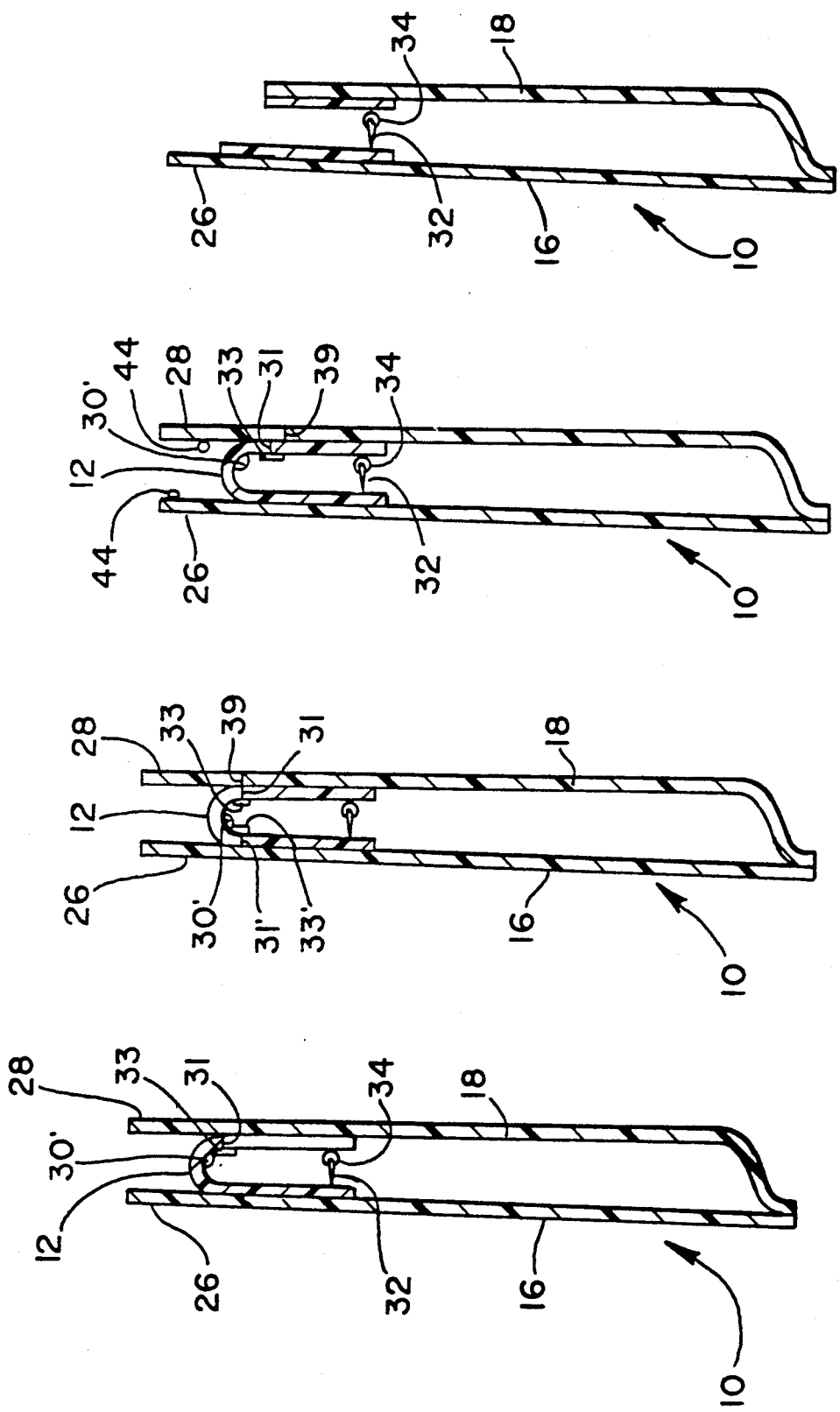

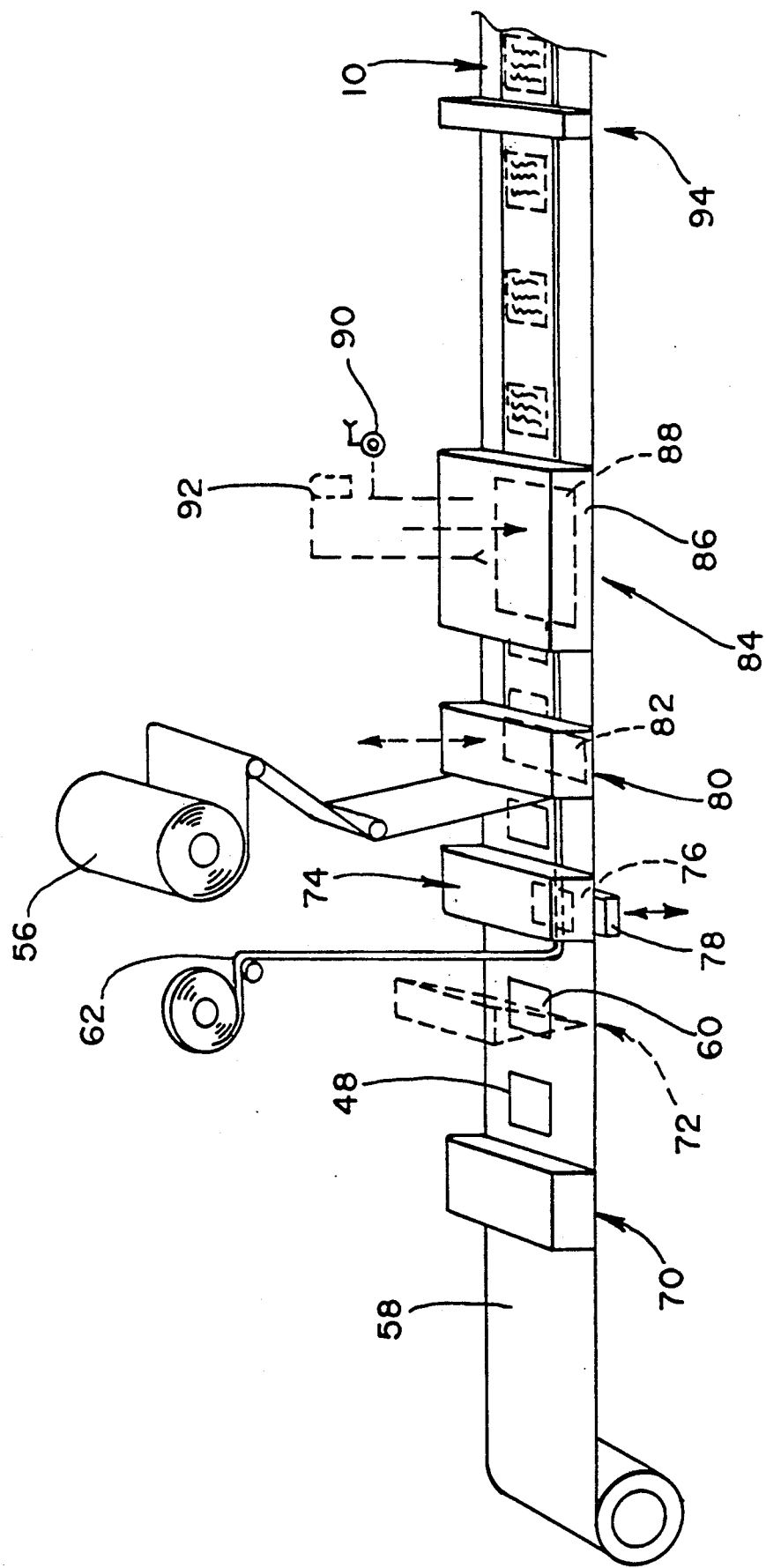

PERFORATED TEAR STRIP FOR EASY-OPEN FLEXIBLE CONTAINERS

CROSS-REFERENCE TO RELATED APPLICATIONS

This is a continuation-in-part of U.S. Application Ser. No. 595,240, filed Oct. 9, 1990 pending, the disclosure of which is hereby incorporated by reference.

BACKGROUND OF THE INVENTION

The present invention relates to a method for making improved means for opening flexible containers. In particular it relates to a method for incorporating a separate film or membrane having means for tearing and interlocking zipper elements into a bag-like structure to form an easy-open reclosable flexible container. The present invention further relates both to the membrane and flexible containers produced by the method.

Because reclosable flexible containers are by their very nature accessible, accidental or intentional contamination of contents has long been an object of concern. One approach has been to hermetically seal reclosable flexible containers to protect the contents thereof. Use of hermetic seals, however, has required the further development of easy-open features, such as tear strips and perforated or weakened lines for tearing to disrupt the seal and gain access to the bag contents. Many easy-open features desirably evidence any tampering with the container seals.

Among the approaches to hermetically sealing flexible containers is the attachment of separate films or membranes over the mouth opening of a bag-like structure so that the membrane serves as the top edge of a container. See, for example, U.S. Pat. No. 4,874,257 to Inagaki. Thereafter, the membrane which forms the hermetic seal may be ruptured to gain entry to the bag contents, irreversibly evidencing such entry. In Inagaki cutting is evidently the means of rupturing since no other opening means are disclosed.

However, other opening means for rupturing hermetically sealed containers are known. Thus, Siegel, U.S. Pat. No. 4,615,045 discloses a bag structure having a removable bag top closure including interlocking profiles. One flange of the top closure has an upward extension for hanging the bag. Opposing pull flanges form a tongue which seals the bag mouth and may be removed by tearing across serrations, perforations, or weakened lines therein, to gain access to the bag contents. Unless the tongue on the bag is intact, there would be an indication that access to the bag was attained or attempted.

Likewise, Thompson et al in U.S. Pat. No. 4,966,470 discloses various means for rupturing hermetically sealed containers so as to provide a visual, tamper-evident feature on reclosable packages which also include an inner hermetic peel seal and an outer reclosable seal.

Ausnit, U.S. Pat. No. 4,894,975 (the '975 patent), discloses a membrane having interlocking zipper elements. The membrane is folded and sealed to opposing bag walls to form a tamper-evident security seal across the mouth of the bag which also serves as the top edge of the container. The top of the seal may be torn off along parallel lines of weakened tear resistance to open the bag.

Of further relevance is Ausnit et al, U.S. Pat. No. 4,812,074 (the '074 patent), wherein a film containing interlocking zipper elements is sealed to a web of thermoplastic material forming a two-layered area of film and web. Folding the web brings the zipper elements into opposing relationship with the film layer inside and the web layer outside the top edge of the container which results. The film, thus, does not serve alone to seal the edge of the container. The '074 patent further discloses a tear strip located in the film by which both the film and web are torn to gain access to the bag contents.

Problems have arisen in the use of various means to open hermetically sealed containers. Because of concerns with contamination and freshness, use of perforations or serrations to define a weakened line for tearing, as disclosed by Siegel, are not practical in many applications, particularly in packaging foodstuffs. They provide a series of small openings to the bag contents through which bacteria may migrate or contaminants may be introduced undetected. Problems have also arisen with containers having narrowed regions for tear lines as disclosed in the Ausnit '975 patent. For example, consumers have been unable to actually tear the thermoplastic material. Further, once weakened regions are initially torn, irregular tearing may deviate off-line down the bag lips. Irregular tearing is a problem which also accompanies the use of tear strips, such as used in the '074 patent, as the tear lines may deviate down the bag lips and propagate into the zipper elements, compromising the strength, shape and operation of the zipper elements.

Accordingly, further developments are needed to facilitate easy-opening of reclosable containers, while maintaining a tamper-evident barrier to contamination.

SUMMARY OF THE INVENTION

The present invention meets the continuing need for new and improved easy-open reclosable containers having hermetic, tamper-evident seals which are easily opened without damage to the interlocking first and second zipper elements. In the present invention, an easy-open reclosable container results from folding and then sealing a membrane having improved means for tearing across the opening of a bag-like structure.

A bag-like structure may include, without limitation, diverse structures such as balloons, envelopes, socks and sleeves, as well as more traditional sacks, pouches and bags, and hereafter for simplicity is referred to as a bag. The bag opening is defined by two generally opposing bag walls to which the membrane is sealed. Folded and sealed to opposing bag walls, the membrane forms an edge of the container along the fold.

The membrane has a first, inner and second, outer surface, and includes means for tearing and interlocking first and second zipper elements. Means for tearing the membrane preferably comprise a first bead of thermoplastic material, a first perforated line of tearing and a first sealing strip. The first bead is preferably disposed generally centrally between the zipper elements, and is either immersed in the membrane material or located on the first or second surface of the membrane. The first perforated line of tearing is spaced from the first bead and its perforations pierce the membrane. Preferably, those perforations, in turn, are sealed by the first sealing strip, which also is preferably disposed on the first surface of the membrane.

A second perforated line of tearing may be provided in the opposite side of the membrane, spaced from the first bead, however, that structure is not preferred. A second sealing strip would be required to seal the perforations of a second perforated line of tearing.

To enhance folding the membrane, it is preferable to locate the first bead offset slightly from the fold line. It is also preferred to enhance tearing to offset the position of the first bead in the direction of the first perforated line of tearing.

Thus, when the membrane is folded and sealed to opposing bag walls, the first and second zipper elements are brought into opposing relationship, and the first bead, first perforated line of tearing and first sealing strip are generally located along the edge of the container formed by the film.

To enhance handling of the container once it is opened, additional means for gripping, such as one or more second beads of thermoplastic material, may be added to the remaining portions of the membrane, anywhere on the membrane surfaces, preferably upward from the zipper elements on the first, inner surface.

The membrane serves to seal the bag contents against contamination, and eliminates the need for other conventional seals. Moreover, disruption of the membrane to gain access to the bag, whether by means for tearing or otherwise, may be detected, making the container tamper-evident.

In sealing the membrane to the inside of the bag walls, the portions of the membrane carrying the first and second zipper elements are preferably left unattached to the bag walls. This structure has the advantage of allowing the bag to expand somewhat without producing stress which would tend to open interlocked zipper elements. This is of particular interest in practicing one embodiment of the present invention wherein the bag is formed with a cavity or pocket to receive products, such as foodstuffs, and in other embodiments where a simple bag is filled with product.

More efficient bag side seals are made possible by the present invention as the zipper elements, disposed on a membrane of thin thermoplastic material, present a thinner cross-section which requires less time and temperature to seal than traditional thicker, single extrusion low density zipper elements. Further, the second surface of the membrane may be comprised of high heat melt material, as in the preferred multi-layer embodiment, discussed more fully below, which facilitates rapid low temperature sealing of the membrane to the bag walls.

As the membrane and the bag are separately produced, they may be made from different materials, making possible the use of different material properties and thicknesses. Thus, for example, the membrane may preferably be made of thin thermoplastic film which is easily ruptured.

In the preferred embodiment of the membrane of the present invention, the first bead is an oval-shaped first bead of thermoplastic material, such as low density polyethylene (LDPE), disposed on the first surface of the membrane along with the zipper elements which may also be LDPE. It has been found that the oval shape of the first bead enhances the tearing action of the bead when one of the narrow faces of the oval first bead is disposed against the first surface. So disposed, the narrow face serves as the leading edge for tearing the membrane, and its cross-section has a knife-like effect on the membrane. Notches or slits along one or more of the bag side seals may be included to help initiate tearing.

Further, in the preferred embodiment of the present invention the membrane includes two or more layers made of materials which provide desirable sealing or manufacturing properties. In one embodiment, the membrane has three layers, an inner heat resistant layer which serves as the first surface; a middle barrier layer; and an outer sealing layer, which serves as the second surface of the membrane. The inner heat resistant layer, preferably comprised of ethylene acrylic acid (EAA) or ethylene vinyl acetate (EVA), prevents fusing together opposing portions of the first surface of the membrane when the second surface thereof is sealed to opposing bag walls. The middle barrier layer, preferably comprised of saran (polyamylidene chloride) or ethylene vinyl alcohol (EVOH), includes properties which enhance hermetic sealing with the membrane, providing a barrier to gases, moisture and bacteria. The outer sealing layer, is preferably a polyethylene such as low density polyethylene (LDPE) having a low heat melt temperature which facilitates sealing the membrane to opposing bag walls at low temperatures and high speeds without sealing together opposing portions of the first surface of the membrane.

In an alternative embodiment of the multilayer membrane, a two layer membrane is provided having inner and outer layers providing first and second surfaces, respectively. In this alternative embodiment, the inner layer, preferably comprised of high density polyethylene (HDPE), serves to prevent fusing together of opposing portions of the first surface of the membrane. The outer layer remains as described above.

In a first alternative embodiment of the present invention, the membrane of the present invention is sealed to opposing bag walls inward from the mouth of the bag, leaving portions of the bag walls extending upward beyond the container edge to form guide rails. In a second alternative embodiment, the guide rails may be joined above the membrane by means of a peel seal to provide a further level of security and tamper-evidence. In either alternative embodiment, a third perforated line of tearing may be provided in at least one of the guide rails by which the associated guide rail may be detached from the bag. While the membrane of the present invention is designed to function without need of additional features, several further advantages are provided by the alternative structures.

In the first and second alternative embodiments, tearing is initiated by the first bead as before. The guide rails, however, provide an additional safeguard against deviating tear lines. That is, attachment of the membrane inward from the bag opening further permits the bag walls to serve as reinforcement against the propagation of tear lines down the membrane, protecting the integrity of the zipper elements thereon. Thus, tearing may be limited by the guide rail on one bag wall, and by the perforated line of tearing on the other. Advantageously, the guide rails also promote upward tearing of the membrane by the first bead. As well, prior to opening, the guide rails serve as protection against accidental damage or puncture of the membrane by shielding contact between the second surface thereof and the external environment.

Where a third perforated line of tearing is provided, the guide rail portion of the bag wall extending above the third perforated line of tearing is also intended to be removed when the bag is opened. Preferably, the third perforated line of tearing is aligned with the first or second perforated line of tearing in the membrane.

Once the container has been opened and a guide rail removed, the remaining guide rail provides additional gripping area for opening the bag. Gripping and separation of the bag lips is facilitated by the unequal lengths of the opposing bag walls. Additional means for gripping, such as second beads of thermoplastic material, may be added to the remaining portions of the guide rail or the membrane, anywhere on the membrane's first surface, preferably upward from the zipper elements. It may also be desirable to place means for gripping, such as second beads of thermoplastic material, on the outer surfaces of the guide rails to promote removing the one guide rail along the perforated line of tearing, and gripping of the other. In use after opening, the remaining guide rail may also serve as a means to assist in dispensing the bag contents, or handling the bag, especially when handling heated bag contents.

In the second alternative embodiment, a peel seal provided between the opposing guide rails provides a hermetic seal which obviates the need for the first sealing strip to seal the first perforated line of tearing and, further, obviates the need for a separate barrier layer in the membrane. However, if a third perforated line of tearing is provided in a guide rail of the second embodiment, then those elements are still needed to maintain a hermetic seal at the membrane.

In a further aspect of the present invention, a method is provided for producing an easy-open container. While the method is described with reference to a horizontal packaging method where it may be best performed in an intermittent stepwise manner, it may be adapted to be performed equally on vertical packaging devices. The method produces individual sealed, easy-open containers from three webs: a form web; a top web, from which the bag sides are ultimately formed; and a membrane web.

More particularly, a form web is directed to a horizontal forming station where a pouch, pocket or female cavity is formed. The form web then proceeds to a filling station where product is loaded into the cavities. The form web then proceeds to a pre-seal station where a folded membrane web having interlocking zipper elements is aligned with the form web and positioned to seal to the form web in an area inward from the top edge of the form web. The folded membrane web is then sealed to the form web with a first seal. The first seal extends along the second surface of the folded membrane web in at least a portion of the area between the means for tearing, i.e. either the first bead or the first perforated line of tearing, and the edge of the folded membrane web. The first seal is preferably in an area inward from the first bead or first perforated line of tearing and above the first zipper element. This first seal is accomplished by first feeding the membrane web into the tracking shoe of a back-up plate and then, during a pause in web movement, by raising a pre-seal assembly to compress the form web and membrane web together against the back-up plate to form a weld seal bond. The form web with membrane web sealed thereto, next advances to a pre-flattening station.

In the pre-flattening station the top web is drawn over and positioned above the form web and membrane web. As the web movement again pauses, a sealing assembly lowers to compress the top web against the membrane web and form web. Heat and pressure are applied to two areas by the sealing assembly. These areas lie roughly in the region where final bag side seals will later be formed. The heat and pressure cause melting down and flattening of the first bead and zipper elements in two areas, substantially 0.25 inches to 1.0 inches wide, forming second side seals.

Following the pre-flattening station, a web assembly of the form web with membrane web and top web sealed thereto, advances into the final seal station in a vacuum chamber. The web assembly of form web, membrane web and top web are positioned therein under a sealing die assembly. The web movement is again stopped while a vacuum is pulled or gas is purged into the chamber, and the seal die assembly, preferably simultaneously, lowered to form bag side seals and a fourth seal, a bottom edge seal between the top web and form web. The seal die assembly further forms a third seal, a weld seal bond, between the top web and the membrane web along its second surface generally opposite the first seal, between the means for tearing and the second zipper element. By virtue of the preferred multi-layer membrane material, wherein the first surface is comprised of heat resistant material, the third seal may be formed without mechanically separating opposing first surfaces of the membrane web to prevent their sealing together. Other membrane materials may require a step of mechanically separating the opposing first surfaces prior to forming the third seal.

After the final seal station, the top web is sealed to the form web with the membrane web sealed therebetween, enclosing and hermetically sealing the product. The sealed webs are then advanced to a severing station where the web is severed into individual sealed, evacuated or gas-flushed containers, loaded with product. The containers which result are easily opened by the means for tearing, and are reclosable with interlocking first and second zipper elements.

A first alternative method is further provided in accordance with the second and third alternative embodiments of the container previously set forth. In the first alternative method, in the preseal station the folded membrane web is positioned inward from the end of the form web to produce a guide rail. Similarly, in the pre-flattening station where the top web is drawn over and positioned above the form web and membrane web, the top edge of the top web is preferably aligned with the top edge of the form web to form a second guide rail. The top edge of the top web may also be offset slightly from the end of the form web to enhance parting the two guide rails for access to the means for tearing.

In a still further aspect of the present invention, a separate membrane is provided which may be used for sealing the opening of a bag-like structure, and is constructed and made of materials as previously described. In addition, in a first alternative embodiment the membrane preferably includes fourth and fifth perforated lines in areas where first and third seals are made with the membrane. The fourth and fifth perforated lines are provided, not for tearing, but to facilitate evacuation of air and gas flushing of the web assembly during production or packaging operations.

A method for making a membrane is also further provided. A thermoplastic membrane web having two or more layers of material, as previously described, is provided for extruded. Preferably, the membrane has a first heat resistant surface, a second sealing surface and a barrier layer capable of hermetically sealing a bag therebetween. A first perforated line of tearing is then made in the membrane. Preferably, third and fourth perforated lines for venting are also, simultaneously, made in the membrane. Next is a step of extruding, on the first surface, a first bead of thermoplastic material, generally centrally down the length of the membrane web; and preferably, simultaneously, extruding base layers with first and second zipper elements along opposite sides of the membrane web; and preferably, simultaneously, extruding a first sealing strip along the first perforated line of tearing.

BRIEF DESCRIPTION OF THE DRAWINGS

FIG. 4 is an exploded perspective view of the container of the present invention.

FIG. 5 is an exploded cross-sectional view of the top edge of the container of FIG. 4 along line 5—5.

FIG. 6 is a perspective view of the membrane of the present invention partially folded.

FIG. 7 is a cross-sectional view of the preferred embodiment of the present invention.

FIG. 8 is a cross-sectional view of an alternative embodiment of the present invention.

FIG. 9 is a cross-sectional view of an alternative embodiment of the present invention.

FIG. 10 is a representative cross-sectional view of the embodiments of FIGS. 2, 3, 7-9, 12 and 13 after opening.

FIG. 14 is a schematic representation of the method for making a container of the present invention.

DETAILED DESCRIPTION OF THE PREFERRED EMBODIMENT

Figure 2:
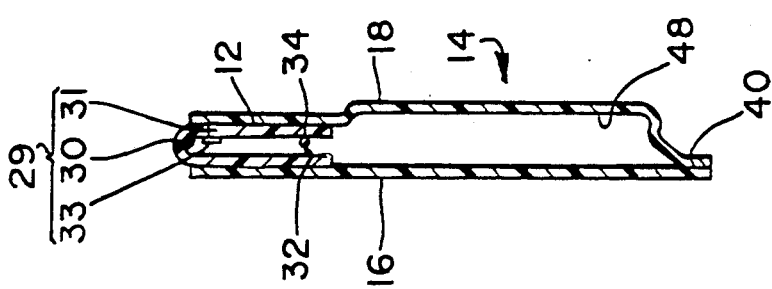
FIG. 2 is a cross-sectional view of the container of FIG. 1 along line 2—2.
Figure 1:
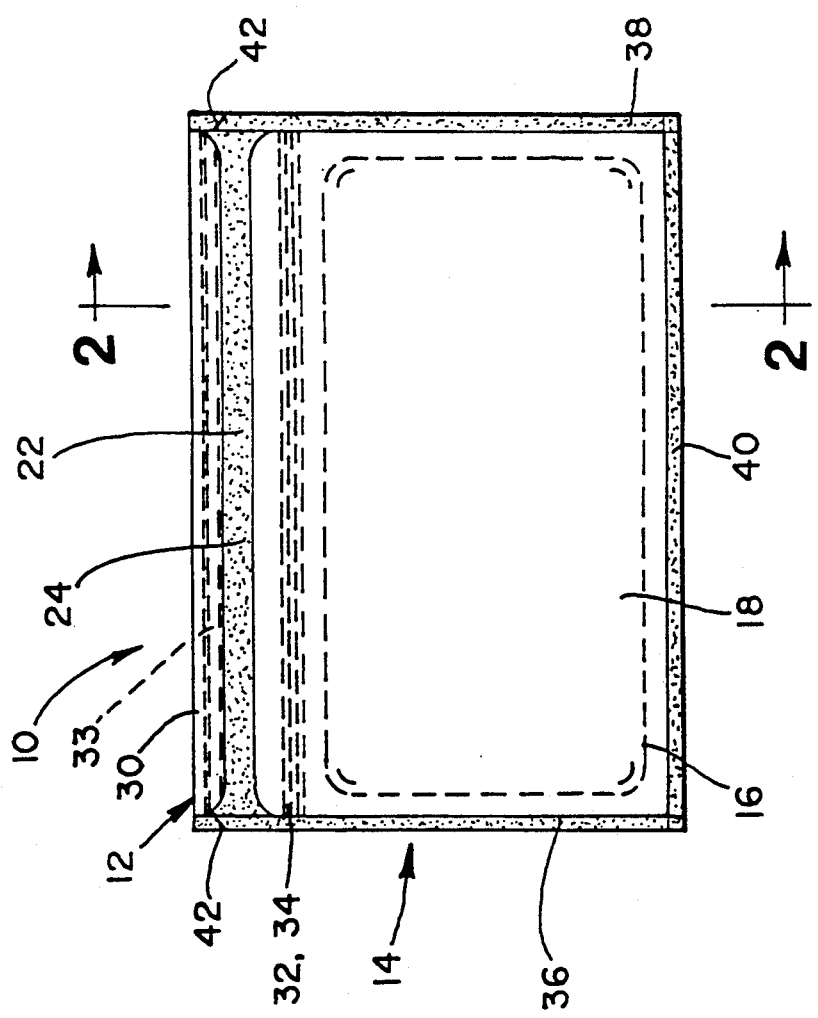
FIG. 1 is a front elevational view of the easy-open container of the present invention.

Referring to FIGS. 1 and 2, in accordance with the present invention, a reclosable flexible container 10 is shown having a membrane 12 sealing the opening of bag 14. As seen more clearly in FIG. 3, membrane 12 is sealed to the inside of bag walls 16 and 18 across bag opening 20 along seals 22, 24.

Membrane 12 includes on its first surface interlocking first and second zipper elements 32, 34 and a means for tearing 29 shown in FIGS. 1-9 and 11-13. Means for tearing 29 comprises a first bead 30 of thermoplastic material, such as LDPE, and a first perforated line of tearing 31 and first sealing strip 33.

First bead 30 is disposed generally centrally between zipper elements 32, 34, and defines a first tear line across membrane 12. Preferably, first bead 30 has an oval-shape, shown best in FIG. 6. As shown in FIGS. 4-6, first bead 30 (or oval-shaped first bead 30') are preferably positioned slightly off-center on membrane 12 in the direction of first perforated line of tearing 31. Offset positioning of first bead 30 or oval-shaped first bead 30' facilitates folding membrane 12, and serves to enhance tearing. Where an oval-shaped first bead 30' is provided, a wide face of the oval is attached to membrane 12 between zipper elements 32, 34. As a result, a narrow face of oval-shaped first bead 30' is oriented to serve as the leading edge for tearing membrane 12 along the first tear line.

Figure 3:
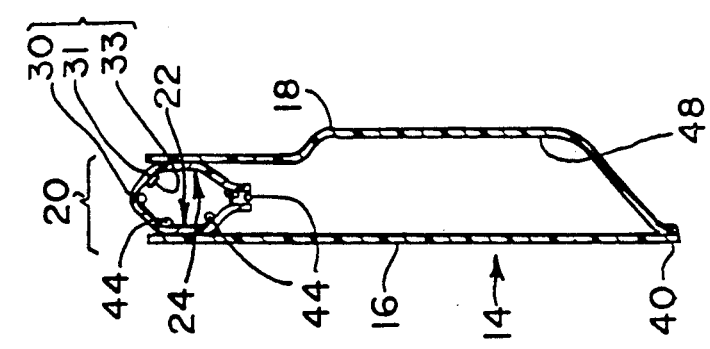
FIG. 3 is an expanded cross-sectional view of the container of FIG. 1 along line 2—2.

First perforated line of tearing 31 defines a second tear line across membrane 12 and is disposed between one of the zipper elements 32, 34, for example zipper element 34, as shown in FIG. 3, and first bead 30. First sealing strip 33 is disposed on membrane 12 along first perforated line 31, preferably on the first surface of membrane 12 to hermetically seal first perforated line 31. Tearing of first perforated line of tearing 31 along the second tear line is initiated by first bead 30 or oval-shaped first bead 30', and such tearing is also enhanced by the offset position thereof.

Referring again to FIG. 1, bag walls 16, 18 are sealed together along bag side seals 36, 38 and bottom edge seal 40. As is preferred, slits 42 are provided in bag side seals 36, 38 to assist the consumer to initiate tearing of membrane 12. The length of bag walls 16, 18 will remain unchanged below zipper elements 32, 34, whether container 10 is sealed or open.

Further shown typically in FIG. 3 are additional means for gripping 44. Preferably, second beads of thermoplastic material 44' such as LDPE, comprise means for gripping 44, which may be placed in various locations on membrane 12 as shown typically in FIG. 3. Finally, while FIGS. 1-3 show an embodiment of container 10 having a cavity 48, bag walls 16, 18 of container 10 could, as well, both be flat or have other forms impressed therein.

Referring to FIG. 6, the preferred embodiment of the membrane used in the present invention is shown. Membrane 12 is comprised of two or more layers of thermoplastic material, chosen for their advantageous sealing and manufacturing properties. In the embodiment shown, three layers are provided, inner layer 54, middle layer 52 and outer layer 50. Inner layer 54 is a heat resistant layer, preferably of EAA or EVA, which prevents the opposing surfaces of membrane 12 and bag walls 16 and 18 from sealing together when membrane 12 is sealed to bag walls 16 and 18 to form container 10. Middle layer 52 is a barrier layer, preferably of saran or EVOH, to provide the desired hermetic seal across bag opening 20. Outer layer 50 is a sealing layer, preferably of LDPE having a low heat melt temperature, which facilitates sealing membrane 12 to the inside of bag walls 16, 18. Bag walls 16, 18 are preferably made of polyethylene.

Alternatively, middle layer 52 and inner layer 54 may be combined in one material as inner layer 54' as shown in FIG. 6. In this alternative, inner layer 54' has properties which provide both heat resistant and hermetic sealing properties desired in membrane 12. One such material would be Surlyn (a carboxylic acid-ethylene copolymer).

In a first alternative embodiment of the present invention, seen in FIGS. 7-9, membrane 12 is sealed to the inside of bag walls 16 and 18 inward from the bag opening 20 along seals 22, 24. Portions of bag walls 16, 18 thereby extend above seals 22, 24 to form guide rails 26, 28. Guide rails 26, 28 urge and promote upward tearing of membrane 12 by first bead 30 (or oval-shaped first bead 30') along a first tear line across membrane 12. Guide rails 26, 28 also serve as additional reinforcement against downward deviation of the first or second tear lines on membrane 12. First, second and third perforated lines of tearing, 31, 31' and 39, may be variously located as shown in FIGS. 7-9.

Figure 13:
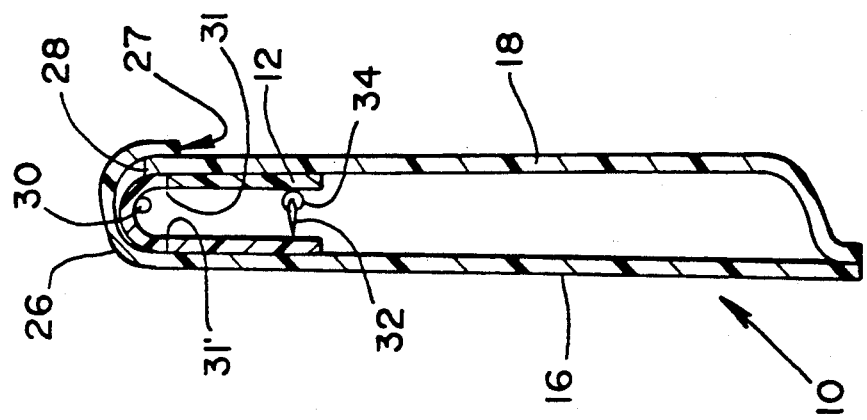
FIG. 13 is a cross-sectional view of an alternative embodiment of the present invention.
Figure 12:
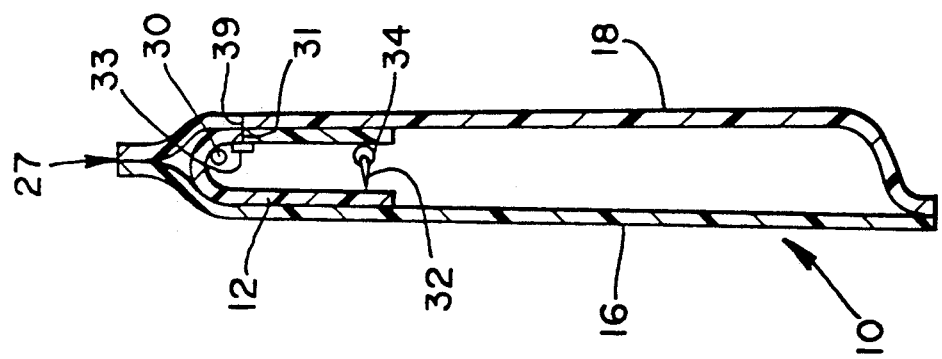
FIG. 12 is a cross-sectional view of an alternative embodiment of the present invention.
Figure 11:
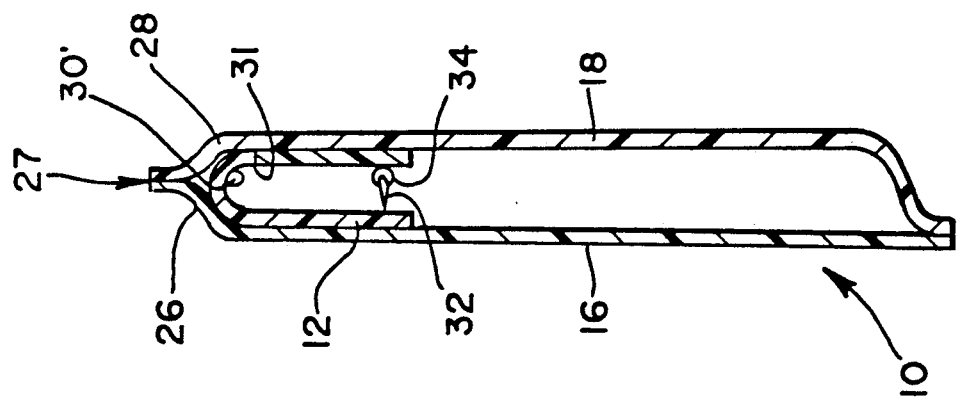
FIG. 11 is a cross-sectional view of an alternative embodiment of the present invention.

In a second alternative embodiment, shown in FIG. 11-13, guide rails 26, 28 are peel sealed above membrane 12 to provide a hermetic seal. In either the first or second alternative embodiment, a third perforated line of tearing 39 may be disposed in the guide rail offset from, but preferably adjacent the first perforated line 31, as shown in FIGS. 7-9 and 12-13, to permit removal of one guide rail, and to offset guide rails 26, 28, as shown in FIG. 10 after removal. Such offset ends enhance separation of opposing bag walls 16, 18 in use, and may provide additional gripping area. First, second and third perforated lines for tearing 331, 31' and 39 may be variously located as shown in FIGS. 11-13. A second sealing strip 33' is also shown for sealing second perforated line of tearing 31'

As representatively illustrated in FIG. 10, tearing initiated by first bead 30 or oval-shaped first bead 30' along the first tear line is limited by the guide rail 26 of bag wall 16, should tearing deviate down the bag wall. Tearing along the second tear line is both limited and defined by the first perforated line of tearing 31, and a deviating tear line as well, may be limited by guide rail 28 of bag wall 18.

An illustrative example of the various embodiments of the present invention is set forth in FIGS. 4 and 5. In a typical application involving a substantially 22 centimeter (cm) × 30 cm container, where guide rails 26, 28 are provided, dimension B of guide rails 26, 28 may be 2-6 millimeters (mm), while correspondingly, dimension C extends downward from the top edge 7-11 mm, depending if additional length is needed to form peel seal 27. The overall dimension A from the folded edge of membrane 12 to the bottom of zipper elements 32, 34 may be 21 mm, with the bottom flap dimension F extending as desired, say 1.5 mm. The area in which seals 22 and 24 are formed (shown in FIG. 3) is dimension D, which in this example is 11 mm, centered in dimension A. Dimension E, the width of zipper elements 32, 34, is given as 3.2 mm in this example. These dimensions are to illustrate, but not limit, the scope of the present invention.

Bag walls 16, 18 may be of different lengths so that one guide rail may extend upward further than the other to facilitate their separation. As shown in FIG. 10, once container 10 is torn open, remaining portions of guide rails 26, 28 assist the consumer in gripping bag walls 16, 18 to obtain access to the contents of the bag.

The present invention further provides a method for producing an easy-open container 10. Shown schematically in FIG. 14, a form web 58 of thermoplastic material having a top edge and a bottom edge advances to horizontal forming station 70. Preferably, cavities 48 are formed therein at spaced intervals. Form web 58 then proceeds to filling station 72 where product 60 is loaded into cavities 48.

Form web 58 next proceeds to pre-seal station 74, where folded membrane web 62, having interlocking first and second zipper elements 32, 34 and means for tearing 29, is positioned above form web 58 for sealing thereto Folded membrane web 62 is the continuous web from which membranes 12 of individual containers are made, and like numbers refer to like elements of membrane 12. Folded membrane web 62 may also have a multi-layer structure as previously describe for membrane 12. Thus, as before, folded membrane web 62 includes means for tearing 29 comprising a first bead 30, first perforated line 31, and first sealing strip 33.

Membrane web 62 is first fed into the tracking shoe of a back-up plate 76 and then, during a pause in web movement, sealed along its second surface to form web 58 by raising pre-seal assembly 78 to compress form web 58 and membrane web 62 together against back-up plate 76, forming first seal 24. As shown in FIGS. 1 and 3, first seal 24, a weld seal bond, preferably extends along the second surface of membrane web 62 in an area inward from means for tearing 30 and upward from second zipper element 34.

Form web 58, with membrane web 62 sealed thereto, next advances to pre-flattening station 80, wherein top web 56 is drawn over and positioned above form web 56 and membrane web 62. As the web movement again pauses, sealing assembly 82 lowers to compress top web 56 against membrane web 62 and form web 58. Heat and pressure are applied to two areas of the assembled webs by sealing assembly 82 to form second seals. The second seals include the regions where bag side seals 36, 38 will finally be formed. The heat and pressure cause meltdown and flattening of first bead 30, first sealing strip 33, and zipper elements 32, 34, and seals top web 56 to both form web 58 and membrane web 62. By way of example and not limitation, the second seals are each typically, substantially 0.25 to 1.0 inches wide.

Following pre-flattening station 80, the web assembly of form web 58, membrane web 62, and top web 56, advances into final seal station 84 in vacuum chamber 86. The web assembly of form web 56, membrane web 62 and top web 56 is positioned therein under sealing die assembly 88. Web movement is again paused while chamber 86 is evacuated by vacuum pumping means for pumping 90. Gas may also be purged into chamber 86 at this time by means for injecting gas 92 to package or preserve product 60. Preferably simultaneously, seal die assembly 88 is lowered to finally form bag side seals 36, 38 and a fourth seal, bottom edge seal 40. At the same time, seal die assembly 88 also forms third seal 22 (see FIGS. 1 and 3), a weld seal bond between top web 56 and membrane web 62 along the second surface of membrane web 62. Third seal 22 extends generally opposite first seal 22, between first bead 30 and first zipper element 32, as shown in FIG. 3.

Finally, the sealed web assembly of webs 56, 58 and 62 is then advanced to severing station 94 where it is severed into individual sealed, evacuated or gas-flushed containers 10, loaded with product.

While the method of the present invention is representatively shown producing a chain of single containers 10, the method may be practiced to produce multiple containers 10 side by side or in groups. As well, the position of first perforated line 31 in membrane 62 may be reversed and first perforated line 31 positioned in the opposing walls of membrane 62. The position of first and second zipper elements 32, 34 on membrane web 62 may also be reversed.

In a first alternative embodiment of the method of the present invention, when form web 58 proceeds to pre-seal station 74 for sealing folded membrane web 62 thereto, folded membrane web 62 is positioned above form web 58, inward from the top edge of form web 58 to create guide rail 28. The further inward molded membrane web 62 is positioned, the longer the guide rail 28 becomes.

Further, in the first alternative embodiment of the method of the present invention, when form web 58 with membrane web 62 sealed thereto, next advances to pre-flattening station 80, top web 56 may similarly be drawn over and positioned above form web 56 and membrane web 62 to create guide rail 26. Top web 56 may also be positioned so that its top edge is offset from the top edge of form web 58. This offset enhances separation of bag walls 16, 18 to access the membrane for opening or to gain access to the bag contents for use.

Finally, to facilitate the steps of sealing first and third seals 24, 22, when guide rails 26, 28 are produced in accordance with the method of the present invention, the folded membrane web 62 is provided with fourth and fifth perforated lines for venting 35, as shown in FIGS. 4-6. Fourth and fifth perforated lines for venting 35 are needed where guide rails 26, 28 are provided to prevent trapping gas or air between surfaces of the web assembly at the open end thereof during evacuation or gas flushing.

In accordance with either the preferred method or first alternative embodiment of the method, where a third perforated line of tearing 39 is to be provided in form web 58 to permit removal of one of the guide rails upon opening the container, the step of perforating form web 58 may be accomplished at any step prior to forming first seal 24, preferably as form web 58 advances towards filling station 72. Third perforated line of tearing 39 is preferably positioned to be aligned with first perforated line of tearing 31 when folded membrane web 62 is sealed thereto.

Where peel seals are to be provided between guide rails 26, 28, peel sealable material is provided on the surfaces thereof. The step of peel sealing is preferably performed at final seal station 84. In a further aspect of the present invention, a separate membrane 12 is provided as previously described. Membrane 12 is shown in FIG. 6, partially folded. Membrane 12 may be used for sealing the opening of a bag-like structure such as opening 20 of bag 14 shown in FIG. 3. Best shown in FIG. 6, membrane 12 includes first and second interlocking zipper elements 32, 34 and means for tearing 29 comprising first bead 30, first perforated line 31, and sealing strip 33. Preferably, an oval-shaped first bead of thermoplastic material 30' is used.

First bead 30 and sealing strip 33 are shown in FIG. 6, as is preferable, disposed on the first, inner surface of membrane 12, but could also be disposed on the second, outer surface of membrane 12. First bead 30 may also be formed into the membrane material itself. Preferably, first bead 30 or oval-shaped first bead 30', is attached slightly off-center between zipper elements 32, 34, to enhance folding of membrane 12. By attaching a wide face of first bead 30' to membrane 12, a narrow face of first bead 30' may be oriented upward when membrane 12 is folded to serve as the leading edge for tearing.

As further shown in FIG. 6, membrane 12 is comprised of two or more layers of thermoplastic material having qualities, characteristics and material composition as previously described above. In addition, means for gripping 44, preferably second beads of thermoplastic material 44' such as LDPE, may be added to membrane 10 on the first, inner surface thereof as shown FIG. 3.

Figure 15:
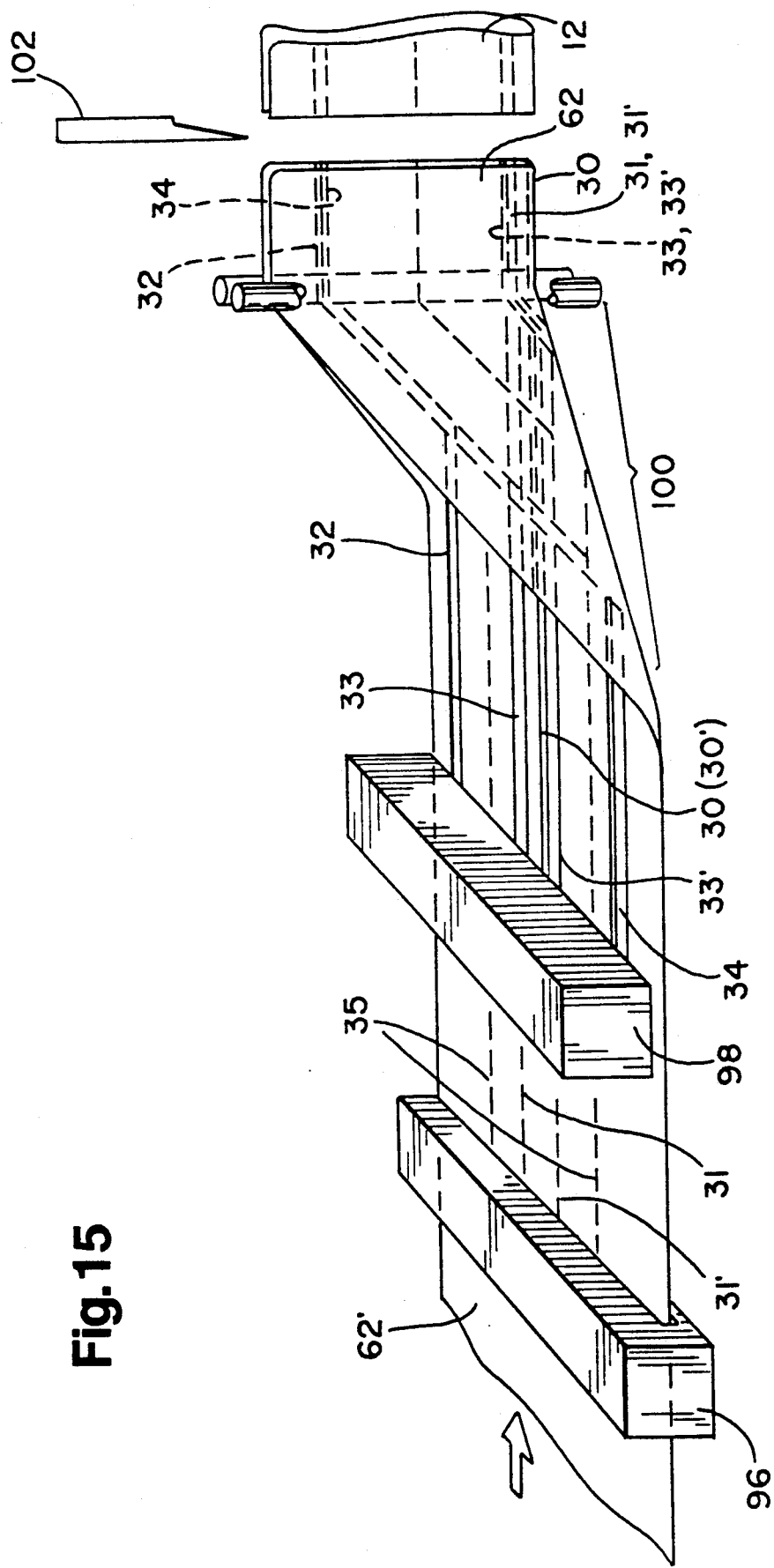
FIG. 15 is a schematic representation of the method for making the membrane of the present invention.

Finally, a method for making a membrane 12 for use in sealing the opening of an easy-open container 10 is provided, and shown schematically in FIG. 15. The first step is to provide or extrude a thermoplastic membrane web 62' having two or more layers including a first heat-resistant surface and a second sealing surface. Next, membrane web 62' is perforated at station 95 along first perforated line 31. Where a second perforated line of tearing 31' or a fourth or fifth perforated line for venting 35 is to be provided, such is also performed at this time.

The next step is attaching a plurality of elements: first bead 30, preferably an oval-shaped first bead 30' of thermoplastic material; first sealing strip 33; and first and second zipper elements 32, 42; preferably, onto the first surface of membrane web 62'. This step preferably involves simultaneously extrusion of first bead 30, sealing strip 33 and zipper elements 32, 34, at station 98. Preferably, interlocking zipper elements 32, 34 are extruded generally along opposite edges of membrane web 62'; first bead 30 is generally centrally disposed therebetween, but preferably slightly off-center on the membrane web 62; and sealing strip 33 between first bead 30 and one of zipper elements 32, 34.

Base layers (not shown), as known in the art for zipper elements, may also be extruded onto the first surface of membrane 12 along with first and second zipper elements 32, 34. Further, the step of extruding first bead 30, sealing strip 33, base layers, and zipper elements 32, 34 may include also extruding means for gripping 44, comprising one or more second beads of thermoplastic material, onto the first surface of membrane web 62'.

The method may further comprise folding membrane web 62' at station 100 to bring interlocking first and second zipper elements 32, 34 into opposing relationship. Finally, folded membrane web 62 may be severed at station 102 to form membranes 12 or folded membrane web 62 may be wound into a roll.

While certain representative embodiments and details have been shown for purposes of illustrating the invention, it will be apparent to those skilled in the art that various changes in the articles and methods disclosed herein may be made without departing from the scope of the invention, which is defined in the appended claims.

What is claimed is:

1. An easy-open flexible container comprising:
    a bag structure of thermoplastic material having an opening defined by two generally opposing bag walls; and
    a membrane having a first surface and a second surface, and said membrane further including:
        interlocking first and second zipper elements disposed on said first surface of said membrane; and
        means for tearing said membrane disposed generally between said first and second zipper elements; said means for tearing comprising a first bead of thermoplastic material defining a first tear line, and said means for tearing further comprising a first perforated line of tearing defining a second tear line; wherein said first bead and said first perforated line are in spaced relationship on said membrane; and
    wherein said membrane is folded to form a container edge and seal said opening, said membrane attached along said second surface thereof to the inside of said bag walls.

2. An easy-open container as recited in claim 1 wherein portions of said bag walls extend upward beyond said container edge to form guide rails.

3. An easy-open container as recited in claim 1 wherein said first perforated line is disposed in a portion of said membrane which is not attached to said bag walls.

4. An easy-open container as recited in claim 3 wherein said first perforated line is located adjacent to a portion of said membrane which is attached to one of said bag walls.

5. An easy-open container as recited in claim 1 wherein said first perforated line is disposed in a portion of said membrane attached to one of said bag walls.

6. An easy-open container as recited in claim 1 wherein said membrane is folded to form a container edge and bring portions of said membrane into opposing relationship, said first perforated line of tearing disposed on one portion, and said membrane further comprising a second perforated line of tearing disposed on an opposing portion of said membrane.

7. An easy-open container as recited in claim 1 further comprising a third perforated line of tearing disposed in said bag wall adjacent said first perforated line and in generally parallel relationship with said first perforated line.

8. An easy-open container as recited in claim 7 wherein said membrane further comprises fourth and fifth perforated lines, one each disposed in a portion of said membrane to be sealed to said opposing bag walls, said fourth and fifth perforated lines adapted for transit of gases therethrough during production of said container.

9. An easy-open container as recited in claim 6 wherein said second perforated line is generally aligned in parallel relationship with said first perforated line.

10. An easy-open container as recited in claim 6 wherein said membrane further comprises a second sealing strip disposed on the first surface of said membrane along said second perforated line of tearing.

11. An easy-open container as recited in claim 1 wherein said membrane is attached to said bag walls along portions of said second surface upward from said zipper elements towards said first bead, and portions of said membrane bearing said zipper elements extend downward unattached to said bag walls.

12. An easy-open container as recited in claim 11 wherein said guide rails extending beyond said container edge are sealed together to form a peel seal above said container edge.

13. An easy-open container as recited in claim 1 wherein said membrane is of a different thickness than said web.

14. An easy-open container as recited in claim 13 wherein said membrane thickness is less than that of said web.

15. An easy-open container as recited in claim 1 wherein one or more portions of one or more of said bag walls extend beyond said container edge and include means for gripping said bag walls.

16. An easy-open container as recited in claim 15 wherein said means for gripping comprises one or more second beads of thermoplastic material.

17. An easy-open container as recited in claim 1 wherein:
said membrane is comprised of two or more layers;
said first bead is disposed on said second surface positioned generally centrally between said zipper elements in the area of said membrane forming the container edge; and said first bead has a generally oval-shape with two wide and two narrow faces, generally oriented on said second surface so that one of said wide edges attaches thereto; and
said membrane further comprises:
a first sealing strip disposed on the first surface of said membrane along said first perforated line of tearing; and
means for gripping disposed on said first surface generally between said first bead of thermoplastic material and at least one of said first and second zipper elements.

18. A membrane for sealing an opening of a bag structure to form an edge of an easy-open container, wherein said membrane has a first surface and a second surface, and further comprises:
interlocking zipper elements disposed on said first surface of said membrane: and
means for tearing said membrane disposed generally between said first and second zipper elements, said means for tearing comprising a first bead of thermoplastic material defining a first tear line and a first perforated line of tearing defining a second tear line, said first bead and said first perforated line in spaced relationship on said membrane.

19. A membrane as recited in claim 18 wherein said membrane is comprised of two or more layers.

20. A membrane as recited in claim 18 wherein said first bead is positioned generally centrally between said zipper elements.

21. A membrane as recited in claim 18 wherein said membrane further comprises a first sealing strip disposed on the first surface of said membrane along said first perforated line.

22. A membrane as recited in claim 19 wherein said film comprises:
an inner heat resistant layer to prevent fusing together said first surfaces when folding and sealing said second surfaces to seal the opening of a bag-like structure;
a middle barrier layer for hermetically sealing the opening of a bag structure; and
an outer sealing layer for sealing said membrane to the walls of a bag structure.

23. A membrane as recited in claim 22 wherein:
said inner heat resistant layer is comprised of ethylene acrylic acid or ethylene vinyl acetate;
said barrier layer is comprised of polyvinylidene chloride or ethylene vinyl alcohol; and
said outer sealing layer is comprised of high density polyethylene.

24. A membrane as recited in claim 19 wherein said film comprises:
an inner layer both for hermetically sealing the opening contents of said bag structure and for preventing the fusing together said first surfaces when folding and sealing said second surfaces to seal the opening of said bag structure; and
an outer layer for sealing said membrane to the walls of said bag structure.

25. A membrane as recited in claim 24 wherein said inner layer is comprised of a carboxylic acid-ethylene copolymer, and said outer layer is comprised of high density polyethylene.

26. A membrane as recited in claim 18 wherein said first bead of thermoplastic material comprises a first oval-shaped bead having two wide and two narrow faces, generally oriented so that one of said narrow edges comprises the leading edge thereof for tearing.

27. A membrane as recited in claim 18 further comprising means for gripping.

28. A membrane as recited in claim 27 wherein said means for gripping comprises one or more second beads of thermoplastic material.

29. A membrane as recited in claim 27 further comprising means for gripping disposed on said first surface between said first bead of thermoplastic material and at least one of said first and second zipper elements.

* * * * *

UNITED STATES PATENT AND TRADEMARK OFFICE
CERTIFICATE OF CORRECTION

PATENT NO. : 5,121,997

DATED : June 16, 1992

INVENTOR(S) : LaPierre et al.

It is certified that error appears in the above-identified patent and that said Letters Patent is hereby corrected as shown below:

In Abstract, next to last line, "stcutures" should be --structures--.

Col. 9, line 61, a --period-- should be inserted after "thereto".

Col. 14, lines 28-29, "bag-like" should read "bag".

Signed and Sealed this

Thirty-first Day of August, 1993

Attest:

BRUCE LEHMAN

Attesting Officer        Commissioner of Patents and Trademarks